United States Patent [19]

Fukumoto et al.

[11] Patent Number: 5,155,678
[45] Date of Patent: Oct. 13, 1992

[54] DATA AVAILABILITY IN RESTARTABLE DATA BASE SYSTEM

[75] Inventors: Takeshi Fukumoto, Yokohama; Takayuki Funahasi, Tokyo, both of Japan; Gerhard Schweikert, San Jose, Calif; Harrison Scofield, Morgan Hill; Terrence E. Walker, San Jose, Calif; James W. Young, Jr., San Jose, Calif.

[73] Assignee: International Business Machines Corporation, Armonk, N.Y.

[21] Appl. No.: 792,371

[22] Filed: Oct. 29, 1985

[51] Int. Cl.⁵ .............................................. G06F 11/08
[52] U.S. Cl. ................................. 395/425; 364/282.1; 364/268; 364/264; 364/DIG. 1; 395/600
[58] Field of Search ... 364/200 MS File, 900 MS File, 364/300; 371/9, 9.1, 11.1, 11.3, 16.5, 8.1, 21.6, 29.1

[56] References Cited

U.S. PATENT DOCUMENTS

| | | | |
|---|---|---|---|
| 3,623,008 | 11/1971 | Doblmaler et al. | 364/200 |
| 3,636,331 | 1/1972 | Amrehn | 371/9.1 |
| 3,651,480 | 3/1972 | Downing et al. | 340/172.5 |
| 4,099,234 | 7/1978 | Woods et al. | 364/200 |
| 4,099,241 | 7/1978 | Ossfeldt | 364/200 |
| 4,351,023 | 9/1982 | Richer | 371/9.1 |
| 4,358,823 | 11/1982 | McDonald et al. | 364/200 |
| 4,399,504 | 8/1983 | Obermarck et al. | 364/200 |
| 4,443,849 | 4/1984 | Ohwada | 364/200 |
| 4,453,215 | 6/1984 | Reid | 364/200 |
| 4,455,601 | 6/1984 | Griscom et al. | 364/200 |
| 4,480,304 | 10/1984 | Carr et al. | 364/200 |
| 4,507,751 | 3/1985 | Gawlick et al. | 364/900 |
| 4,628,508 | 12/1986 | Sager et al. | 371/9.1 |
| 4,709,325 | 11/1987 | Yajima | 371/11.3 |

FOREIGN PATENT DOCUMENTS 1163859 of 0000 United Kingdom .
2032149 4/1980 United Kingdom .

OTHER PUBLICATIONS

T. L. Borden et al., "Method Using Token and Token Table to Prevent I/O Operations to Selected Data Sets After Subsystem Failure", IBM Technical Disclosure Bulletin, vol. 28, No. 3, Aug. 1985, page 1108.

H. A. Beier et al., "Shared Data Availability Across a System Failure", IBM Technical Disclosure Bulletin, vol. 28, No. 3, Aug. 1985, pp. 950-951.

Mutzeneek, "using mini-Computers in Systems Engineering", Electronic Engineering, vol. 43, No. 516, pp. 45-47, Feb. 1971.

Serlin, "Fault-Tolerant Systems in Commerical Applications", IEEE Computer, vol. 17, No. 8, pp. 19-30, Aug. 1984.

Inselberg, "Database-Management Systems", Mini-Micro Systems, vol. 16, No. 14, pp. 193-205, Dec. 1983.

"Shared Data Availability Across a System Failure", IBM Technical Disclosure Bulletin, vol. 28, No. 3, pp. 950-951, Aug. 1985.

*Primary Examiner*—Allen R. MacDonald
*Assistant Examiner*—Debra A. Chien
*Attorney, Agent, or Firm*—R. Bruce Brodie; Pryor A. Garnett; George M. Knight

[57] ABSTRACT

A method for maintaining switchover between a backup and degrading active processor, which switchover is transparent to a terminal accesssing the active processor with atomic transactions. The backup processor prepares for an outage by the active processor by synchronizing, tracking, and monitoring the active processor's log entries. When the active processor fails, the backup processor performs the necessary recovery processing and takes over user-transactions processing as the new active processor.

8 Claims, 11 Drawing Sheets

IMS/XRF SUBSYSTEM STRUCTURE

IMS/XRF INTERSUBSYSTEM COMMUNICATION

IMS/XRF ACTIVE SYSTEM         IMS/XRF ALTERNATE SYSTEM

START IMS

ACTIVE PHASE                  START IMS (ALTERNATE)
- START TRANSACTION
  PROCESSING.
                              INITIALIZATION PHASE

SYNCHRONIZATION PHASE
                              ← — — — 1. REQUEST SNAPQ CHECKPOINT
- TAKE SNAPQ CHECKPOINT — — — → 2. USE THE CHECKPOINT TO:
                                     A. BUILD CONTROL BLOCKS TO
                                        SAME LEVEL AS "ACTIVE".
                                     B. PREOPEN DATA BASES.
                                     C. PRESTART TERMINAL BACKUP
                                        SESSIONS.
                                  3. ALLOW DEPENDENT REGION
                                     PRESTART.
                                  4. START SURVEILLANCE TO DETECT
                                     "ACTIVE" FAILURE.

TRACKING PHASE
- LOG SYSTEM ACTIVITY — — — — → 1. USE THE "ACTIVE'S" SYSTEM LOG
                                     RECORDS TO CONTINUE:
                                     A. UPDATE CONTROL BLOCKS.
                                     B. PREOPEN/CLOSE DATA BASES.
                                     C. PRESTART/TERMINATE
                                        TERMINAL BACKUP SESSIONS.
                                     D. COLLECT BACKOUT AND
                                        FORWARD RECOVERY DATA FOR
                                        DATA BASES.

FAILURE DETECTED OR — — — — →
PLANNED TAKEOVER REQUESTED    TAKEOVER PHASE
                                  1. SETUP/START PARALLEL DATA BASE
                                     BACKOUT AND FORWARD RECOVERY.
                                  2. INITIATE TERMINAL SESSION
                                     TAKEOVER.
                                  3. ENABLE DEPENDENT REGION TO
                                     START ENTERING TRANSACTIONS.

TERMINATION
                              ACTIVE PHASE

| SWITCH      | DATA BASE    | PROCESS   |
                              | TERMINAL    | FORWARD/     | NEW TRXS  |
                              | SESSIONS    | BACKOUT      |           |
                              |             | RECOVERY     |           |

NORMAL PROCESSING

IMS/XRF PHASES

FIG. 3

ACTIVE AND BACKUP TERMINAL SESSIONS

SAMPLE IMS/XRF ACTIVE-ALTERNATE CONFIGURATION

```
***********************************************************************
***     ESTABLISH XRF SYSTEM LINK IF IT IS AN ALTERNATE SYSTEM         *
***********************************************************************
 1               SPACE 1
 2               TM      FRBFLAG1,FRBBCKUP      ALTERNATE SYSTEM?
 3               BNO     RST00010               ELSE,
 4               L       R3,FRBL1CLB            ISC SYSTEM LINK CLB ADDRESS
 5               LTR     R3,R3                  ISC SYSTEM LINK EXISTS?
 6               BZ      RST00010               ELSE,
 7               TM      SCDCFLG1,SCDC1ACB      VTAM ACB OPENED?
 8               BNO     RST00010               ELSE,
 9               USING   IECTDECB,R3            SET CLB ADDRESSABILITY
10               OI      CLBVFLG1,CLBV1SIM      SET SIMLOGON REQUEST
11               NI      CLBFLAG2,X'FF'-CLB2NOIN-CLB2NOOU
12               NI      CLBFLAG2,X'FF'-CLB2NOQU-CLB2IDLE
13               L       R15,CLBCTB             POINT RELATING CTB
14               DROP    R3                     RESET CLB ADDRESSABILITY
15               USING   CTB,R15                SET CTB ADDRESSABILITY
16               NI      CTBFLAG2,X'FF'-CTB2INOP RESET INOPE FLAG
17               DROP    R15                    RESET CTB ADDRESSABILITY
18               ICM     R4,B'1111',=CL4' OPN'  SET POST CODE
19               IPOST   ECB=(R3),PCODE=(R4) POST ISC LINK CLB
20    RST00010   DS      0H
```

FIG. 6          ESTABLISHING THE OPTIONAL ISC LINK

```
***********************************************************************
***     READ THE LOG                                                    *
***********************************************************************
 1               SPACE 1
 2    LOGREAD    DS      0H
 3               LTR     R15,R15                RC FROM PROC LAST RECORD
 4               BNZ     ABND168                ISSUE ABEND
*.. START SURVEILLANCE HERE IF ALL THE DC PREOPEN FINISHED.
*.. THE SURVEILLANCE HAS NOT STARTED YET.
 5               L       R14,SCDFRB             LOAD FRB POINTER
 6               LTR     R14,R14                XRF ENVIRONMENT?
 7               BNM     LOGREAD1               ELSE, DON'T BOTHER.
 8               USING   FRB,R14                SET FRB BASE
 9               TM      FRBSRVF1,FRBSRVIN      SURVEILLANCE FUNC INITIATED?
10               BO      LOGREAD1               THEN, DON'T BOTHER.
11               TM      FRBPOPNN,X'08'         DC PREOPEN HAS COMPLETED?
12               BNO     LOGREAD1               ELSE, DON'T BOTHER.
13               DROP    R14                    RESET FRB BASE
14               L       R15,=A(SURVSTAT)       SURVEILLANCE STATUS ROUTINE
15               BALR    R14,R15                START SURVEILLANCE
16    LOGREAD    DS      0H
17               L       R15,TAPEGET            A(GET ROUTINE)
18               BALR    R14,R15                GET RECORD
19               LTR     R15,R15                OKAY?
20               BZ      LOGTYPE                YES - DETERMINE TYPE
21               CH      R15,=H'4'              END OF FILE ON LOG?
22               BNE     ABND3141               NO - ERROR
23               B       LOGEOF                 YES
```

FIG. 7          READING THE ACTIVE'S SYSTEM LOG

```
***************************************************************
***     DETERMINE THE RECORD TYPE                             *
***************************************************************
 1              SPACE 1
 2              USING LOG01,R2
 3     LOGTYPE  DS    0H
 4              LR    R2,R1              LOG RECORD REG
 5              SR    R1,R1              ZERO
 6              IC    R1,CHKLCODE        GET LOG RECORD TYPE
 7              L     R14,LOGRECXA       GET A(LOGRECXT)
 8              IC    R1,0(R1,R14)       GET BRANCH TABLE INDEX
 9              B     LOGBR(R1)          GOTO PROPER ROUTINE
10     LOGBR    DS    0H                 TYPE     WHERE TO
11              B     LOGREAD    0       6F, 71-FF - GET NEXT RECORD
12              B     LOG0056    4          56 - DFSRESP0
13              B     LOG005A    8        5A-6C - DFSCRSP0
14              B     LOG0059    C          59 - DBFERST0
15              B     LOG0050    10      50-53, 41 - DFSRBLB0
16              B     LOG004C    14         4C - DFSRDBP0
17              B     LOG0047    18         47 - DFSRDBP0
18              B     LOG0040    1C         40 - DFSRLP00 + OTHERS
19              B     LOG0037    20         37 - DFSCRSP0, DFSRBLB0,
20              B     LOG0007    24      07-08 - DFSRDBP0
21              B     LOG0006    28         06 - DFSRBLB0
22              B     LOG005A1   2C       REST - DFSCRSP0
23              B     LOG0038    30         38 - DFSCRSP0 + DFSRBLB0
24              B     LOG0070    34         70 - DFSICV90
25              B     LOG006D    38         6D - DFSRLP00
26              B     LOG0025    3C         25 - DBFTOLR0 OR DFSTOLR0
27              B     LOG0026    40         26 - DBFTOLR0 OR DFSTOLR0
28              B     LOG0020    44      20-21 - DFSRDBP0,DFSHRDB0
29              B     LOG0027    48         27 - DFSRELP0
```

PROCESSING THE ACTIVE'S LOG RECORDS

FIG. 8

```
***************************************************************
***     CHECKPOINT LOG RECORDS - '40'                          *
***************************************************************
 1            SPACE   1
 2            USING   LOG01,R2
 3   LOG0040  DS      0H
 4            L       R14,SCDFRB              A(FRB)
 5            USING   FRB,R14                 SET ADDRESSABILITY
 6            LTR     R14,R14                 AN XRF SYSTEM?
 7            BNM     LOG00402                NO, SKIP XRF CODE
 8            TM      FRBFLAG1,FRBACTV+FRBRSTRT THE ALTERNATE SYS?
 9            BNO     LOG00402                NO, MUST NRE/ERE
10            TM      RSTCTL2,RST2X80         BLDQ COMPLETED?
11            BO      LOGREAD                 YES, GET NEXT RECORD
12            SPACE   1
13            DROP    R14
14            SPACE   1
15   LOG00402 DS      0H
16            LR      R0,R1                   DEBUG
17            SR      R1,R1                   ZERO
18            IC      R1,CHKTYPE              GET CHKPT RECORD TYPE
19            L       R14,CHKRECXA            A(CHKRECXT)
20            IC      R1,0(R1,R14)            GET BRANCH TABLE INDEX
21            B       LOG40BR(R1)             GOTO PROPER ROUTINE
22   LOG40BR  DS      0H
23            B       LOGREAD    0            READ NEXT RECORD
24            B       LOG4001    4            4001 START CHECKPOINT
25            B       LOG4002    8            4002 MESSAGE QUEUE
26            B       LOG4003    C            4003-4005, 4008-4014 & 4020
27            B       LOG4006    10           4006-4007 & 4015
28            B       LOG4030    14           4030 DFSRESPO
29            B       LOG4070    18           4070-4079 MSDB LOG RECORDS
30            B       LOG4080    1C           4080 FAST PATH
31            B       LOG4098    20           4098 END CHECKPOINT
32            B       LOG4099    24           4099 END MESSAGE QUEUE
33            B       LOG4025    28           4025 EEQE
34            B       LOG4026    2C           4026 IOT BUFFER
```

PROCESSING THE ACTIVE'S SNAPQ CHECKPOINT

FIG. 9

DEPENDENT REGION RESTART TABLE STRUCTURE

DL/I LOCK TRACKING: POOL STRUCTURE

DL/I BUFFER TRACKING POOL STRUCTURE

DL/I BUFFER TRACKING TABLE ENTRY

FAST PATH "INDOUBT" BUFFER REDUCTION

TIMER TRACKING: OVERVIEW

```
************ TAKEOVER CODE EXTRACTED FROM DFSRLP00 ************
*
*******************************************************************
***       CLOSE INPUT LOG
*******************************************************************
         L     R15,TAPCLOSE      A(CLOSE INPUT LOG)
         BALR  R14,R15
*******************************************************************
***       PERFORM MESSAGE QUEUE CLEANUP
*******************************************************************
         TM    SCDRSCTL,SCDRSERE ERE?
         BNO   LOGEOF15          NO - BRANCH
         BAL   R8,QRSTCLN        CALL QRST FOR CLEANUP
           .
           .
IDENT10  DS    0H
*******************************************************************
***    DBRC SIGN-ON
*******************************************************************
         MVC   OPTTADDR(8),SCDDATE SAVE CHECKPOINT
         L     R15,DBRCSIGN      A(DBRC SIGNON RTN)
         BALR  R14,R15           SIGNON
         CH    R15,=H'4'         WAS SIGNON SUCCESSFUL
         BH    ABND042           NO - ABEND
*******************************************************************
***       OPEN (OR SWITCH TO) A NEW SYSTEM LOG
*******************************************************************
LOGEOF23 DS    0H
         L     R15,OPNCLS        A(OPEN LOG)
         BALR  R14,R15           AND OPEN THE OUTPUT LOG
*******************************************************************
***       MERGE MESSAGES FROM "LOCAL" TO "NORMAL" QUEUE
*******************************************************************
         LA    R1,8              REQ CODE FOR MSG_Q MERGE
         L     R15,=V(DFSHCI00)  POINT DFSHCI00
         BALR  R14,R15           CALL FOR MSG Q-MERGE
```

XRF TAKEOVER HIGHLIGHTS (PART 1)

FIG. 16

```
************ TAKEOVER CODE EXTRACTED FROM DFSRLP00 ************
******************************************************************
***       SCHEDULE SESSION TAKEOVER IN CASE OF SYSTEM TAKEOVER
******************************************************************
        L     R15,SCDFRB          LOAD FRB POINTER
        LTR   R15,R15             XRF ALTERNATE SYSTEM?
        BNM   LOGEOF25            ELSE, SKIP
        USING FRB,R15             SET FRB ADDRESSABILITY
        TM    FRBFLAG1,FRBBCKUP   ALTERNATE SYS (TAKEOVER)?
        BNO   LOGEOF25            ELSE, SKIP
        L     R0,FRBCFLGS    GET COMMUNICATION FLAGS
EOF24LP1 DS   0H
        LA    R1,FRBC1TKO         SESSION TAKEOVER REQUEST
        SLL   R1,3*8              TURN THE FRBC1TKO BIT ON
        OR    R1,R0               IN FRBCFLGS FIELD
        CS    R0,R1,FRBCFLGS      SET SESSION TAKEOVER REQUEST
        BNE   EOF24LP1            NOOP, LOOP BACK
        LA    R0,255-FRBC1POP
        SLL   R0,3*8              FRBC1POP BIT OFF CONDITION
        ICM   R0,B'0111',=XL3'FFFFFF'
        NR    R0,R1
        CS    R0,R1,FRBCFLGS      IF PREOPEN INIT COMPLETE?
        BNE   LOGEOF25            ELSE, BYPASS IPOST OF HCI10
        L     R1,FRBCPSTA          GET DC PREOPEN PST ADDR
        IPOST ECB=(R1),POST=PCODE2 REQUEST SESSION TAKEOVER
******************************************************************
***       LOCK REAQUIRE           CALL DFSHRALO  AND
***       CREATE DL/I IOT EEQE    CALL DFSHREQ0
******************************************************************
LOGEOF37 DS   0H
        L     R14,SCDFRB          R14 --> A(FAST RESTART BLK).
        LTR   R14,R14             XRF GENNED?
        BNM   LOGEOF38            NO - BYPASS DFSHRALO CALL.
        USING FRB,R14             SET DSECT ADDRESSABILITY.
        L     R15,FRBHRALO        R15 --> A(DFSHRALO).
        BALR  R14,R15             CALL LOCK REAQUIRE MODULE
        L     R14,SCDFRB          RE LOAD FRB PTR
        L     R15,FRBHREQ0        LOCATE ROUTINE
        BALR  R14,R15                AND CALL
        DROP  R14                 RESET DSECT ADDRESSABILITY.
        BCPT  RS                  RECORD VALID RESTART
******************************************************************
```

XRF TAKEOVER HIGHLIGHTS (PART 2)

FIG. 17

DATA AVAILABILITY IN RESTARTABLE DATA BASE SYSTEM

TECHNICAL FIELD

This invention relates to a method for maintaining data availability in a restartable data base system, and more particularly, where the system is externally accessible by at least one terminal.

BACKGROUND OF THE INVENTION

It has long been appreciated that continuity of service can be maintained if a backup processor or system can be substituted for a degrading active processor or system. Examples may be found in air defense system (SAGE), command and control (SAC), astronautics (APOLLO), and airline reservation systems (SABRE). Such systems employed multiple processors operating in tandem on the same data such that, if an active system failed, its backup could replace it. Alternatively, by having multiple processors operating in tandem, it might be possible for an operator to pick and choose either which processor could be treated as the active controlling processor, or whether the results arrived at were credible. Such systems rarely concern themselves with maintaining the integrity of transactions caught in the middle when a backup processor replaces an active degrading processor. For example, in the airline reservation system, it was the responsibility of the ticket agent to confirm the status of any transactions in process and initiate any recovery procedures, and not that of the system itself.

Other pertinent prior art includes Doblmaier et al, U.S. Pat. No. 3,623,008, "Program-controlled Data Processing System", issued Nov. 23, 1971; Downing et al, U.S. Pat. No. 3,651,480, "Program Controlled Data Processing System", issued Mar. 21, 1972; and Griscom et al, U.S. Pat. No. 4,455,601, "Cross Checking Among Service Processors in a Multiprocessor System", issued Jun. 19, 1984.

Doblmaier and Downing describe fault tolerance in a telephone switching system having active and backup processors for controlling telephone connection traffic. In their system, denominated electronic switching system (ESS), each processor's components such as memory or control arrangements are switchably interconnectable therebetween. This means that a faulty memory in the active processor may be replaced immediately by its counterpart from a backup processor. This requires that a near-identical information state by maintained among the components of both processors in order to minimize loss of either calls in progress or calls being processed affected by this switchover.

SUMMARY OF THE INVENTION

It is accordingly an object of this invention to devise a method for maintaining data availability in restartable data base systems. It is a related object to devise a method for overlapping new transactions with restart recovery operations in such data base systems while maximizing transaction integrity and consistency.

The foregoing objects are attained in a method for maintaining switchover between a backup and degrading active processor, which switchover is transparent to a terminal accessing the active processor with atomic transactions. The backup processor prepares for an outage by the active processor by synchronizing, tracking, and monitoring the active processor's log entries. When the active processor fails, the backup processor performs the necessary recovery processing and takes over user-transaction processing as the new active processor. Synchronization is manifest in the form of taking a "snapshot" of the active processor's current status as recorded on the active processor's log. Tracking is accomplished by scanning the active processor's log updates. Thus, by following the system log, the backup processor neither duplicates the same processing as that done of the active processor, nor is it involved with the processing on the active system.

Advantageously, the invention involves continuous updating of the backup processor through a path including the terminal, active processor, and logging facility. In this regard, the active processor updates the log while the backup processor polls the log for updates. This stands in contrast to the Doblmaier and Downing references which describe systems relying upon replicates of the same data base. Indeed, in this invention, a "snapshot" for synchronization with updates is being used for tracking.

BRIEF DESCRIPTION OF THE DRAWING

FIG. 3 sets out the phased flow of control between the active and backup processors.

FIGS. 6-9 set out assembly-level language code traces for respectively establishing an optional link, reading the active processor's log, processing the active processor's log records, and processing the active processor's snapshot checkpointing activity.

FIGS. 16-17 illustrate assembly language backup processor takeover from the inactive processor.

DESCRIPTION OF THE PREFERRED EMBODIMENT AND INDUSTRIAL APPLICABILITY

In the prior art of Information Management System (IMS), outage recovery was handled through an emergency restart procedure. To support an emergency restart, each IMS system always logged all events and information needed for recovery. When the system failed, the operator would restart the job by entering a command that informed the IMS system that this was an emergency restart. IMS would then read the log records created by the failed IMS system in order to perform whatever recovery work was required, and would then continue processing where the failed system had left off. Among the factors which were necessarily involved in the recovery included bringing up another IMS system in emergency restart mode, performing recovery processing (backouts and forward recoveries), manually starting dependent regions and restarting all terminal sessions, and upon demand, authorizing, allocating, and reopening data bases.

In contrast to past requisites, the method of this invention beings up a backup processor which can, by processing the active processor's log records, monitor the state of the active processor and take over for the "active processor" in the event of a planned shutdown or unplanned failure. The backup processor is not merely duplicating the same processing as the "active", nor is it involved in any way with the processing by the active processor. Rather, the backup processor extracts status and recovery information from the active processor's log and does whatever preprocessing it can so that the takeover can be performed with minimal interruption to the end user.

Figure 1:
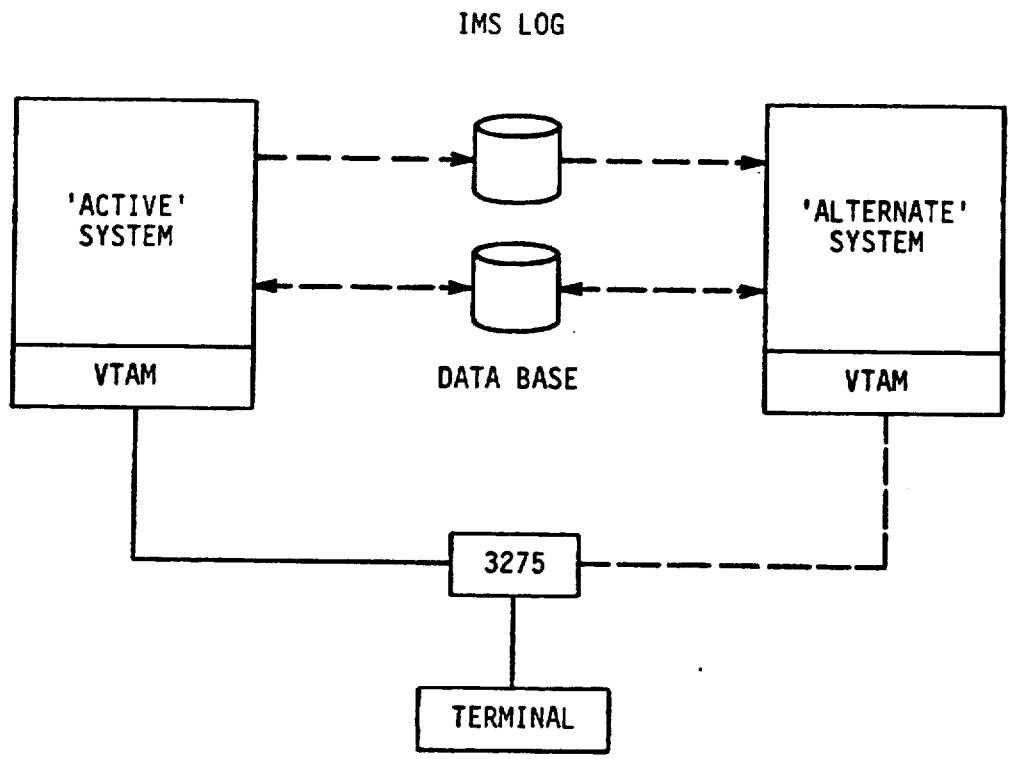
FIG. 1 illustrates the active and alternate data base system configuration according to the invention.

Referring now to FIG. 1, there is shown a configuration of active and backup or "alternate" configurations. The data base is shared between the active and backup processors. The active processor's IMS log is made available to the backup. The backup processor prepares for an outage by "synchronizing" with the active processor, "tracking it", and "monitoring it" for signs of failure. When the active processor degrades, the backup performs the necessary recovery processing and takes over user-transaction processing responsibility as the "new" active processor. The transfer of responsibility includes the making available to the backup processor of all data bases that were available to the active processor, as well as the transfer of active terminal sessions to the backup processor. Thus, the two IMS/VS subsystems shown in FIG. 1 work together to appear as a single active IMS/VS system to the end user.

when starting on the same or different processor, the backup system requests the active processor to take a checkpoint (snapshot) of its current status. The backup processor obtains this checkpoint data from the active processor's log and uses it to achieve "synchronization" with the active processor. The backup then tracks and reflects any active processor status changes by concurrently accessing the log data being produced by the active processor.

The backup processor monitors the activities of the active processor, looking for signs of failure. These surveillance functions can include several methods for detecting conditions requiring the initiation of a "takeover". These methods include utilizations of the active processor's log and a Restart Data Set (RDS).

Figure 2:
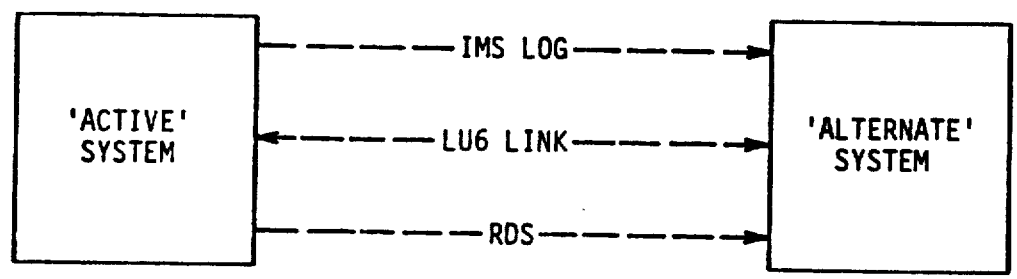
FIG. 2 depicts the intersubsystem communication.

Referring now to FIG. 2, there is shown the communication between the active and backup processors. It should be noted that the backup processor scans the IMS log of the active processor and the Restart Data Set and shares a communication link designated as VTAM LU6.

The following section is organized into the problems to be solved and how this invention addresses them. The explanation is more easily understood within the context of specific processing phases as depicted in FIG. 3. References to the phases in this figure will be made in the description that follows. A later section will use these phases to follow an example of an IMS/XRF (Extended Recovery Facility) "alternate" subsystem taking over for a failing "active" subsystem.

Establishing End User Sessions

When an IMS subsystem is started, terminal sessions are started to allow the user to enter transactions into IMS. Except for the functions described in the following paragraphs, the method of connecting a VTAM-controlled terminal to IMS has not changed. The following VTAM manuals describe the session establishment method before the XRF changes:

1. ACF/VTAN V2 General Information, IBM publication GC27-0608.
2. ACF/VTAM V2 Planning and Installation, IBM publication SC27-0610.
3. ACF/VTAM V2 Operation, IBM publication SC27-0612.

In order to allow IMS to appear to the end terminal user as a "single system image", VTAM implemented User Application Name Variable support. Using this name, an end terminal user can connect to the active IMS subsystem with the capability of processing transactions without knowing the actual VTAM application name of the IMS subsystem. This is because VTAM will translate the User Application Name Variable to the actual VTAM Application Name set by IMS when it becomes an active subsystem capable of processing transactions.

Also, VTAM and NCP were modified to indicate on the CINIT, presented to the active IMS during session establishment, whether the connection can support an XRF-capable session. If so, IMS will BIND an XRF-capable session on the "active". This will result in additional storage being allocated by NCP for the session to maintain extra session status information. The log records written about these sessions will indicate whether or not an XRF-capable session was established.

Should an alternate subsystem be present, a backup session will be established for each XRF-capable session as part of the synchronization/tracking process. This will allow a very fast, session-preserving switch of the terminal at takeover. And the return of NCP-maintained session status information to IMS allows IMS to perform "session recovery" as needed to provide end-user transparency. Session recovery is explained in later sections.

Monitoring the Stage of the Active Subsystem

The alternate subsystem must synchronize itself with the active subsystem at a specific time so that it can track the "active's" processing from that point on. The active subsystem takes a "SNAPQ" Checkpoint for this purpose. It consists of a set of log records which contains the status of the system at the time the checkpoint was taken. The "SNAPQ" Checkpoint is taken by the "active" either by a direct request from the "alternate" via the optional ISC link or by operator command. The operator, in the latter case, receives a message from the "alternate"]requesting that a /CHE SNAPQ command be entered in the active subsystem. When these checkpoint records are written to the "active's" system log, the "alternate" reads and processes them for its synchronization.

Once the alternate subsystem has determined an initial or starting status of the active subsystem from the "SNAPQ" Checkpoint, the status of the "active" is maintained by the "alternate" from the update log records produced by the "active". In FIG. 3, this activity is depicted by the Synchronization Phase and the Tracking Phase.

This monitoring or tracking activity by the alternate subsystem serves three purposes and will be described in terms of these purposes.

1. The "alternate" maintains sufficient information about the "active" to enable it to take over.

The IMS/VS SNAPQ Checkpoint log records and related "change" records were expanded to include sufficient information to allow the alternate subsystem to:

(a) Identify and maintain the current status of the "active's" network—which sessions are active. This information is used to transfer the communications relationship between user and system from the active to the alternate subsystem when a takeover is performed.

(b) Identify and maintain the current status of scheduled application programs.

When an application program is scheduled from a terminal, the data base system must load a set of control blocks that support the scheduling function. It must also determine which data bases the application program can access and load the associated data base description and control blocks. When the application program terminates, these control blocks are released. It is therefore necessary for the active subsystem to inform the "alternate" of application program initiation and termination via the system log. This enables the "alternate" to have the necessary control blocks loaded for applications that were active at the time of a failure.

(c) Identify and track which data bases are open, which are closed, and which are stopped.

To preserve the single-system image to the end user, the alternate subsystem must track the exact state of all of the data bases. This is accomplished by making the active subsystem log the following data base activities:
  data base open/close activities,
  data base data set allocation/deallocation activities, and
  data base authorization and share level activities.

This information allows the alternate subsystem to see that data bases that were available to end users at the time of the active subsystem's failure will be available to them after the takeover.

(d) Identify and maintain the current status of "in flight" data base changes to support possible data base recovery processing after a takeover.

(e) Identify and track any data-sharing locks that are currently held by the active subsystem. This is done to allow the alternate subsystem, at takeover time, to reacquire locks held by the "active" sat the time of the failure. With these locks the "alternate", upon taking over for the "active", can allow new transactions to begin in parallel with backout and forward recovery processing (for which the locks were reacquired).

(f) Ensure that the "clock" on the alternate subsystem is not earlier than the "clock" on the "active". This must be done to keep from destroying the integrity of the data bases after a takeover.

IMS/XRF logic was added to compare the timestamp of the first record of the SNAPQ Checkpoint to the current time in the alternate subsystem. If the "alternate's" time is earlier than the "active's" timestamp, an adjustment factor is calculated and applied to all timestamps generated by the "alternate". It was also necessary to recalculate the adjustment factor for certain critical logs throughout the Tracking Phase.

2. The "alternate" does as much preprocessing as possible in order to speed up the takeover process.

the following preprocessing methods were implemented in IMS/XRF to reduce the elapsed time from the failure of the active subsystem to the enabling of end-user transactions on the alternate subsystem:

(a) Initiate backup terminal sessions

The objective here is to transfer the communications relationship between user and system from the active to the alternate subsystem as quickly as possible with little or no disruption to the end user.

To minimize network switching time, modifications were made to ACF/NCP and to ACF/VTAM to support the establishment of backup terminal sessions concurrent with active sessions and the ability to switch terminal activity to the backup sessions (thus making them the active sessions), and to return session status information to the alternate subsystem. Given this support, IMS/XRF contains modifications to allow the alternate subsystem to:

request backup terminal sessions upon receipt of log records from the "active" informing the "alternate" that an XRF-capable terminal session has been established, request, at takeover time, a network switch causing each backup session to take over as the active session, and compare the session status information returned from the network switch to the log-derived information in order to recover the communication state with transparency to the end terminal user. This is called "session recovery".

Figure 4:
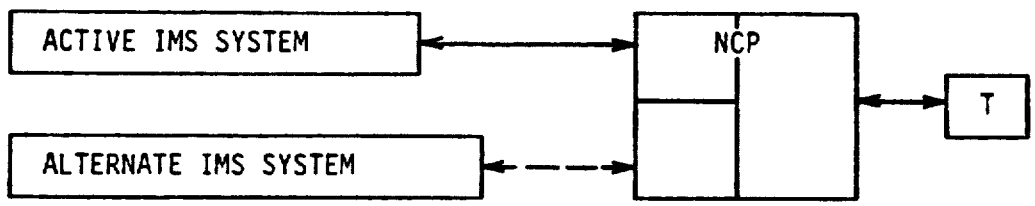
FIG. 4 emphasizes the relationship between the active and backup processors with reference to an attached commonly accessing terminal.

From the terminal user's viewpoint, there is only one session. But from the Network Control Program's viewpoint, there can be two sessions per terminal, only one of which is active. This relationship is pictured in FIG. 4 as implemented in IMS/XRF.

(b) Preload Application Program Scheduling blocks

The loading of the control blocks that support scheduling for each active application program during a takeover would considerably delay completion of the takeover considerably. The solution here was to modify IMS to log sufficient information so that the "alternate" can preload most or all of these blocks during the Tracking Phase.

(c) Preallocate/preopen data bases

To reduce or eliminate the need for the time-consuming process of dynamically allocating and opening data base data sets after the takeover process has begun, the alternate subsystem performs these functions during the Tracking Phase based upon data base status information logged by the "active". When data bases are closed and unallocated by the "active", the "alternate" is informed via the system log so that it can follow suit.

(d) Preauthorize data bases

Data base authorization refers to the process of determining, for a potential user, whether or not a data base is accessible. For example, a data base that has been stopped due to a backout failure is not accessible until recovery processing has been completed. By making the active subsystem log all authorization-related activity, the alternate subsystem can use these logs to drive its authorization processing during the Tracking Phase. IMS/XRF implemented this concept by allowing the alternate subsystem to "inherit" current data base authorizations form the failed "active". In this case, all the "alternate" has to do is track the "active's" authorization activity so that it knows what it has inherited.

3. The "alternate" executes a surveillance function in order to detect a potential failure in the active subsystem.

The alternate subsystem used several methods to automatically detect a potential failure of the active subsystem. All surveillance mechanisms in IMS/XRF are under direct user control. The user selects which mechanisms to activate and specifies what the time-out values of each shall be. The surveillance mechanisms are:

(a) DASD surveillance

For this mechanism, a data set on shared DASD, which is regularly updated by the "active", is required. IMS/XRF uses its Restart Data Set. The "active" periodically updates a timestamp in the data set. The alternate subsystem periodically checks the timestamp to determine if the user-specified time interval has elapsed without the timestamp being updated. If so, takeover decision logic is invoked.

(b) LOG surveillance

The "alternate" periodically checks the system log to determine if the user-specified time interval has elapsed since the last log record was received from the "active". If so, takeover decision logic is invoked.

(c) LINK surveillance

IMS/XRF allows an optional LU6 (ISC) link between the two subsystems to be used for surveillance purposes. When the link is used, the active subsystem sends messages on a regular basis via this link. The "alternate" periodically checks the link to see that these messages are still being received. If the user-specified time interval between messages is surpassed, takeover decision logic is invoked.

(d) LOG status surveillance

The active subsystem generates log records to inform the "alternate" of abnormal conditions. This information can then be used by the surveillance function to determine if takeover decision logic should be invoked. Some examples of abnormal conditions might be:

IMS Resource Lock Manager failure,

VTAM failure, or an IMS abend.

In addition to selecting surveillance mechanisms, the user can also select which combinations of surveillance mechanism failures are to result in a takeover. Furthermore, the user can indicate whether the takeover is to be automatically initiated or whether the Master Terminal Operator is to be informed of the failure. In the latter case, the Master Terminal Operator has the option of initiating the takeover. This takeover decision logic is invoked whenever any of the selected surveillance mechanisms detects a problem.

Workload Transfer to the Alternate Subsystem

This section includes those activities necessary for the alternate subsystem to take over end-user processing responsibilities from the failing active subsystem.

The following functions are performed before new end-user transaction processing is enabled:

1. Prohibit further logging by the active subsystem.
2. Finish processing the active's system log.
3. Notify operators, Lock Manager (IRLM), and Data Base Recovery Control (DBRC) of the takeover.
4. Protect IMS resources by reacquiring locks held by the failing active subsystem.
5. Invoke the I/O Toleration function.

This function allows the takeover to complete even though the backup subsystem cannot guarantee that I/O Prevention has completed on the active subsystem. I/O Toleration intercepts attempts to write to those portions of the data base that could be overwritten by the degrading "active" and saves the results in buffers. When I/O Prevention completes, the I/O Toleration function then does the physical writes to the data bases from the buffers that it has maintained.

As each terminal session gets switched to the alternate subsystem, the end user can begin entering new transactions. At first, the transactions are limited to those portions of the data base not requiring backout or forward recovery processing. But as soon as the backout and forward recovery processing finishes with a portion of the data base, that portion is immediately made available to the end user. Once all backout and forward recovery processing has completed, the alternate subsystem will be operating just like the active subsystem before it failed.

The functions listed below are performed in parallel with the processing of new transactions:

1. At takeover, IMS sets the VTAM User Application Name Variable to the "alternate's" VTAM application ID. This will direct all new end-user logon requests to the now active alternate subsystem. It then initiates communications network switching which makes the backup VTAM sessions the active sessions without losing session control. This is done by changing the mode of the preestablished backup session to "active".

As mentioned earlier, ACF/NCP maintains session status information and returns this information to the IMS subsystem that is taking over. By comparing this session information with information on the system log, the now active IMS subsystem is able to perform session recovery to provide end-user transparency. Normally, this requires no special recovery action. In the even a reply being sent by the failed "active" was never received, the replay will be resent after takeover; or, the new "active" either case, these session recovery actions are performed automatically after takeover, thus providing end-user transparency.

2. Enable scheduling of normal transaction work.
3. Initiate data base backouts and forward recoveries.

These can run in parallel with new work because all locks held by the failing "active" were reacquired by the "alternate" during takeover. That is, the specific portions of the data bases requiring recovery work are protected from new work.

4. Take a simple checkpoint when all recovery and takeover-related work has completed.

The IMS/XRF Implementation

In order to clarify the invention's methods and concepts that were described in the previous section, a sample IMS/XRF configuration will be used to explain how IMS/XRF implemented these methods.

In this section, Data Language/1 (DL/1) and Fast Path refer to two alternative data manipulation languages that a user can choose from to create and modify IMS data bases. For further information, see IBM publication GH20-1260, "IMS/VS General Information Manual".

Also in this section, a "dependent region" refers to an OS/VS virtual storage region that contains an application program. The application program can take several forms: a Batch Message Processing (BMP) program, an IMS Fast Path (IFP) program, or a Message Processing Program (MPP). For further information, see IBM publication GH20-1260.

Several IMS control blocks are mentioned in this section. The Program Specification Block (PSB) is a user-created control block that describes a specific application program—the logical data structures and logical terminals it requires. A Partition Specification Table (PST) is a control block that contains dependent-region information. A PSB Director (PDIR) contains a pointer to the PSB which contains every Program Communication Block required by the application program. There is a DMB Director (DDIR) for each database that is accessible by the application program. Each DDIR contains a pointer to the control block (DMB) that describes one of the accessible data bases. For further information, see IBM publications SH20-9029, "IMS/VS Utilities Reference Manual", and SH20-9026, "IMS/VS Application Programming".

When referring to the IMS system log, this section uses the following terminology: OLDS (OnLine Data Set) is used interchangeably with "IMS system log", and WADS (Write Ahead Data Set) refers to a data set that contains log record which reflect completed operations but which have not yet been written to the "OLDS". For further information, see IBM publication SH20-9029, "IMS/VS Utilities Reference Manual".

Finally, this section refers to several data management access methods used by IMS: Indexed Sequential Access Method (ISAM), Overflow Sequential Access Method (OSAM), and Virtual Storage Access Method (VSAM). For further information, see IBM Publication SH20-9025, "IMS/VS Data Base Administration Guide".

Figure 5:
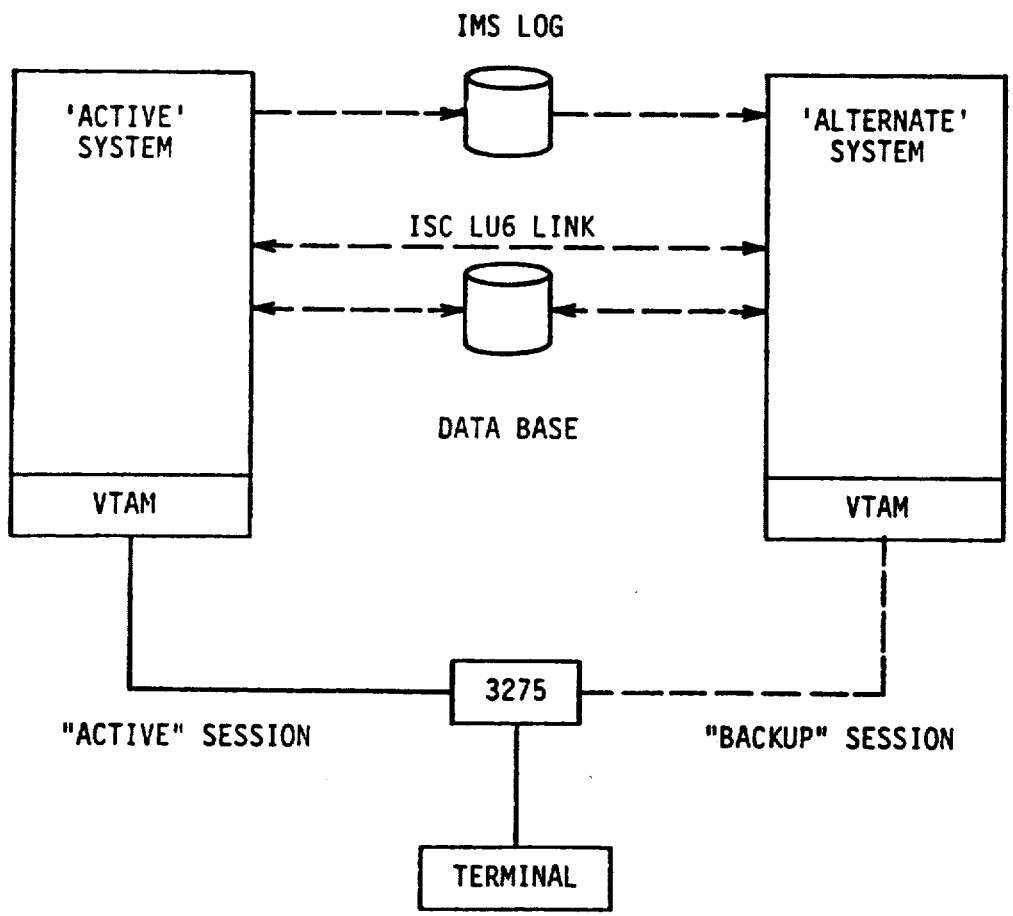
FIG. 5 shows a sample active alternate configuration.

The implementation can be more fully appreciated by following the example through the phases described in FIG. 3. FIG. 5 will be used for these examples. The sections that follow assume that the active system is already initialized and processing transactions. The alternate subsystem will be followed through all of its phases.

The discussion that follows makes the following assumptions about FIG. 5:

1. VTAM and the 3725 NCP support XRF active and backup terminal sessions.
2. The terminal is supported by NCP and VTAM.
3. A DL/I program with access to both DL/I and Fast Path data bases has been loaded into a message-driven dependent region in the active subsystem.
4. The active subsystem is currently processing end-user transactions from the terminal.

Initialization Phase

This phase includes all the functions necessary to establish the alternate subsystem. Key functions here are:
1. bring up IMS/VS as an alternate subsystem,
2. load IMS load modules, and
3. initialize IMS control blocks and pools.

Synchronization and Tracking Phases

In order to synchronize itself with the "active", the alternate subsystem requires that a SNAPQ Checkpoint be taken by the "active". This action consists of logging the "active's" current status. The series of logs that reflect current status ar collectively known as the SNAPQ Checkpoint. If the "active" has not yet generated this checkpoint, the "alternate" has two ways of forcing it to generate one at this time:

1. The "alternate" can send a message to the Master Terminal Operator asking the operator to enter a command to the active IMS subsystem, forcing it to issue a SNAPQ Checkpoint. The "alternate" waits until the checkpoint arrives on the "active's" system log.

2. Optionally, the "alternate" can establish an IMS-managed ISC (VTAM LU6) link between the active and alternate subsystems. Once established, the "alternate" can use the link to request a SNAPQ Checkpoint.

FIG. 6 contains the code that establishes the ISC link. Statements 4-8 determine if the system has the capability of establishing an ISC link. If not, the code to establish the link is bypassed. Thus, this direct link between the active and alternate subsystems is optional. All that is really required is the active subsystem'log.

The use of the SNAPQ Checkpoint log records to get the alternate subsystem in "sync" with the active system leads directly into the "tracking phase" in which the alternate subsystem continues to maintain the "active's" status and recovery information by continuously reading the additional log records generated by the active. This enables the "alternate" to always be ready to take over should the active subsystem fail.

FIGS. 7-9 contain the code that controls the processing of the SNAPQ Checkpoint and all succeeding log records from the active subsystem's log. IMS log records are identified by a four-digit number preceded by "X" (for hex). For example, X'4001' is the Checkpoint log record. The first two digits are the type and the last two digits (when applicable) are the subtype. Looking at FIG. 7, statement 2 is the beginning of the loop that continuously reads the "active's" log until takeover processing stops the "active" from any further log activity. Statement 17 calls a subroutine to read the next log record. The code in FIG. 8 determines what type of log record it is and which module should process it. All SNAPQ Checkpoint records are type '40' records. Type '40' records cause statement 18 to be executed which causes a branch to location "LOG0040". This location can be found in FIG. 9, statement 3. This figure contains the code which determines what type of information is contained in the different SNAPQ Checkpoint records. For example, a '4001' record causes statement 24 to be executed, which causes a branch to location "LOG4001" to de "start of checkpoint" processing. After each log record is processed, control is given back to statement 2 in FIG. 7 so that the next log record can be read.

The log records that support both the initial SNAPQ Checkpoint and the continued status tracking for IMS/XRF are described below based upon the function they support.

Prepare for Terminal/Session Takeover

1. Session initiation/termination tracking:

The following log records are used to track the DC start/stop status. A /START DC command on the "active" opens the VTAM ACB enabling logons to VTAM.

X'4001' Checkpoint log record: used to obtain the DC start/stop status at the time of the checkpoint.

X'02' (IMS Commands) log record: used to track /START DC and /STOP DC commands so that they can be reprocessed by the alternate subsystem.

The following log records are used to track the session active/inactive status:

X'4005' (CTB Checkpoint): used to capture the session status of each node/terminal in the system.

X'63' (Session Initiation/Termination): used to track the session activation/deactivation of nodes/terminals.

If the log record indicates the "active" has established an XRF-capable VTAM session, an attempt will be made to establish a "backup" VTAM session by the alternate subsystem (see FIG. 5). At takeover, these "backup" sessions will be switched to "active" sessions and any necessary session recovery actions will be performed to provide end-user transparency.

2. MFS terminal format blocks preload/release:

An IMS Message Format Service (MFS) terminal format block represents a predefined message format that is moved into the MFS buffer pool as needed. Message Format Services are described in IBM publication SH20-9053, "IMS/VS Message Format Service User's Guide".

Based upon the Queue Manager Enqueue log records (X'35') and Communication Get Unique log records (X'31') produced by the active subsystem because of terminal activity, the alternate subsystem preloads and releases the MFS format blocks. A similar action occurs for Fast Path Input log records (X'5901')and Fast Path Output log records (X'5903').

In this manner, the MFS pool contents of the alternate subsystem approximates that of the "active". In the event of a failure of the "active", the "alternate" can take over without delays required for MFS format block loading.

Prepare for new or rescheduled transaction processing

1. Track-user program scheduling activity:

Upon receipt of a PST Status log record (X'47') (from the initial SNAPQ Checkpoint) or of an Application Program Schedule log record (X'08') created by the active subsystem, the alternate subsystem preloads the required DL/I scheduling blocks. When an application program completes and the "active" produces a Program Termination log record (X'07'), the "alternate" releases the corresponding preloaded DL/I scheduling blocks.

In this manner, the DL/I program scheduling events occurring in the "active" are mirrored by the alternate subsystem. In the event of a failure of the "active", the "alternate" can take over without the delays caused by loading the required DL/I scheduling blocks.

2. Dependent region preopen

To eliminate the delays associated with IMS dependent region initialization, dependent regions can be started on the IMS/XRF alternate subsystem during the Tracking Phase. As with IMS/VS Version 1 Release 3, the IMS dependent region "preload" function will be performed. This includes identifying to Virtual Fetch if necessary. After IMS Identify and Sign-on processing which assigns a "PST", the dependent region will wait in the IMS scheduler for takeover. 'MPP' regions will wait on Scheduler Subqueue three and BMPs (including IFPs) will be chained off a wait chain from their master 'PDIR'.

These arrangements allow complete operator control to start, display, and stop using the existing IMS '/DISPLAY A', '/START REGION' and '/STOP REGION' commands. They also provide a means of properly sequencing the start of the IMS dependent regions and transaction processing at takeover.

3. Dependent region preinitialization routines

To allow users to perform application program initialization in the IMS dependent regions associated with the alternate subsystem before takeover, the ability to exit to user-preinitialization routines has been added. These routines may invoke any MVS service or perform other user processing with the exception of IMS calls.

1. Data base status tracking:

To preserve the single-system image, the alternate subsystem must track the exact state of all of the data bases and areas. The major log records used to pass data base status from the active to the alternate subsystem are:

X'4006': gives DL/I data base status at time of SNAPQ Checkpoint,

X'4084'/X'4087': gives Fast Path Area status at time of SNAPQ Checkpoint,

X'20'/X'21': gives DL/I data base open and close status changes,

X'5921'/X'5922': gives Fast Path Area open and close status changes,

X'4C04'/X'4C08'/X'4C20'/X'4C40'/X'4C82'/X'4CC0': gives DL/I data base status changes, and X'5950': gives Fast Path Area status changes.

Upon receipt of these logs, the alternate subsystem updates its data base control blocks.

Depending on which status items have changes, the "alternate" may perform additional preparatory tasks. The remaining items in this list describe some of these tasks.

2. Data base/area preallocation and preopen:

To reduce or eliminate the time-consuming process of dynamically allocating and opening the IMS data base/area data sets after a takeover, the "alternate" will attempt to allocate them during the Tracking Phase.

If the preallocation of the data base/area is successful, the "alternate" will also attempt to preopen the data base data or area data sets. A preallocation or preopen failure during the Tracking Phase is not considered an error. Rather, another attempt is made when the data base/area is needed after takeover.

The initial SNAPQ Checkpoint's DDIR Status (X'4006') log records cause the alternate subsystem to preallocate and preopen all data bases and area data sets that were allocated and open in the "active" at the time of the SNAPQ Checkpoint.

Since the active subsystem creates an X'20' or X'5921' log record whenever it opens a data base or area data set and creates an X'21' or X'5922' log record whenever it closes a data base or area data set, the alternate subsystem can and does use these log records to cause it to open or close the corresponding data base or area data set.

3. Data base/area authorization and share level tracking

In order to reduce the process of obtaining IMS data base and area authorization and share level from DBRC during or after a takeover, the alternate subsystem tracks the "active's" authorization activity. When the following log records are received, the "alternate" transfers the authorization status from the log record to the appropriate data base/area control block:

X'4006' and X'4084' SNAPQ Checkpoint records, and

X'4C08' and X'5950' records.

4. Data base/area first-update tracking:

To eliminate unnecessary DBRC calls at the first update of IMS data bases after takeover, the alternate subsystem tracks the update activity occurring in the "active". When the following log records are received, the "alternate" transfers the first-update indicator status from the log record to the appropriate data base/area control block.

The DDIR Status (X'4006') SNAPQ Checkpoint log record is used by the "alternate" to set its data base first-update indicators the same as those of the "active" at the time of the checkpoint. Thereafter, the following log records are used to track changes to these indicators:

X'50', X'51', and X'52' log records describe a first-update indicator was turned on, and X'4C04' log record describes a first-update indicator that was turned off.

Prepare for parallel data base backout/forward recovery

The restart processing of IMS systems prior to IMS/XRF did very little parallel processing. As a result, new-user transactions were not allowed to begin until all DL/I backouts were complete and all Fast Path Forward Recovery processing was complete. In order for IMS/XRF to meet its objective of reducing outage time, modifications had to be made to allow new transactions to be processed as soon as possible and in parallel with Restart Recovery processing. These changes will be discussed as part of the Takeover Phase. What follows are several "tracking" requirements that support starting new work in parallel with DL/I backouts and Fast path Forward Recovery.

1. Dependent region status tracking:

Even before IMS/XRF, an emergency restarted IMS system had to track activities of the failed system in order to back out uncommitted DL/I changes. This is necessary because DL/I, when processing a transaction, updates the data base as it goes along. After all updates are complete, it then "commits". Thus, if the system fails before the "commit point" is reached, the "uncommitted" data base updates must be backed out. But the need for an XRF alternate subsystem to perform DL/I backouts concurrent with the processing of new transactions significantly complicated the tracking problem. In the XRF environment, the PST number no longer uniquely identifies the "Unit of Work" (refers to all DL/I change activity for a dependent region between two consecutive sync points). To eliminate this ambiguity, a recovery token is used.

There is a unique recovery token for each "Unit of Work", and all log records created for a particular "Unit of Work" contain both the PST number and the recovery token.

An earlier section entitled "Track-user program scheduling activity" identified the log records that cause DL/I scheduling blocks to be created and released. Those same log records also drive the alternate subsystem to create/release a new block called a Restart PST block (RPST). There is a separate RPST for each unique recovery token. Each RPST contains recovery information for a specific "Unit of Work". The old Restart PST Table from pre-XRF IMS releases has been modified to act as an anchor for RPSTs. Now called a Restart Table, it provides an anchor point for each unique PST number (obtained from the log record). As RPSTs are created, they are chained to other RPSTs with the same PST number, with the first RPST in each chain anchored in the Restart Table (see FIG. 10).

2. DL/I lock tracking

The alternate subsystem tracks the status of the locks for "uncommitted" DL/I data base changes in the active subsystem. This information is used during the Takeover Phase to reacquire these locks so that the restart backouts can run concurrent with new transaction processing. The locks protect the "uncommitted" data base changes from the new transaction processing.

Figure 11:
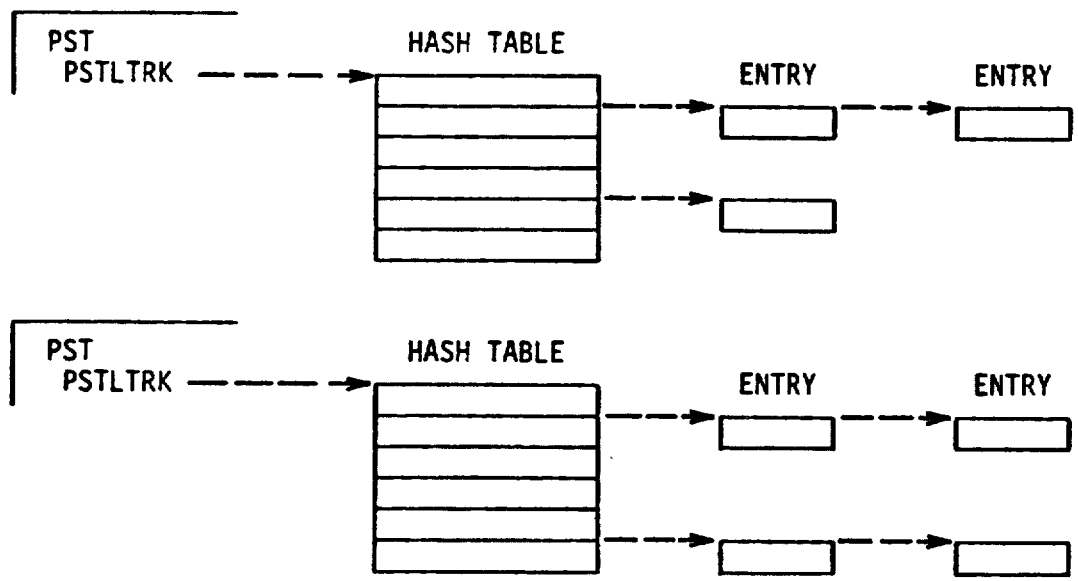
FIGS. 11-13 depict structures involved in lock and buffer tracking of pool structures and buffer tracking table entries.

It was necessary to expand the amount of information included on the existing Data Base Change log records and to add a new log record to support this function. The following information is used:

a. X'07'—Application Program Termination log records b. X'27'—Data Set Extend log records
  lock type
  DCB number
  DBD name
  data set extension flags c. X'37'—DL/I Commit log records d. X'41'—Application Checkpoint log records e. X'50', X'51', and X'52'—DL/I DB Change log records
  region number and recovery token
  first segment indicator
  root/current segment indicator
  block/control interval RBS (relative byte address)
  offset within block/control interval
  root/segment lock ID f. X'53'—DL/I VSAM Control Interval Split Lock Obtained log record
  region number and recovery token
  lock obtained indicator
  lock value The lock information obtained from these log records is maintained in pools of lock-tracking blocks in the "alternate" subsystem using a lock-tracking storage management routine. The pools dynamically expand and contract as dictated by system activity. The information is chained off a hash table which is chained off the system backout PST used to track the associated dependent region activity occurring in the "active" subsystem (see FIG. 11).

After using the region number and recovery token to locate the associated 'PST', the following processing occurs:

a. X'07', X'37' and X'41' log records

When these log records are encountered, all 'entries' chained off of the associated 'PST' are returned to the lock-tracking storage management routine as free space. Should a takeover occur, these locks would not have to be reacquired.

b. X'27' log records

Like the X'50/51/52' log records, the information in the Data Set Extend log records is used to create entries in the hash table reflecting "extend" locks held by the active subsystem.

c. X'50', X'51' and X'52' log records

The information in the DL/I Data Base Change log records is sued to create one or more 'entries' chained off the hash table associated with the modifying 'PST' provided they are not duplicates. Duplicates are thrown away. The 'entries' created reflect DL/I locks that were acquired by the active subsystem.

d. X'53' log record

This log record reflects space management activity and, depending on what the activity is, can cause an entry to be added to or deleted from the hash table.

3. DL/I "indoubt" buffer tracking/reduction

To support DL/I I/O Toleration (described in the section "Takeover Phase"), it is necessary for the alternate subsystem to track the ISAM/OSAM block and VSAM control intervals to which the active subsystem could potentially write.

To accomplish this, the following information on the DL/I Data Base Change log records written by the active subsystem is needed:

a. X'07'—Application Program Termination log records b. X'37'—DL/I Commit log records c. X'41'—Application Checkpoint log records d. X'4C01'—Backout Complete and Backout Failure log records e. X'50' and X'51'—DL/I Data Base Change log records region number and recovery token
first block indicator
new block indicator
FSE (free space element) count
block/control interval RBA (relative block address)
DL/I subpool-ID
subpool buffer number f. X'53'—DL/I HD (Hierarchical Direct) Bit Map Update log record region number and recovery token
block/control interval RBA
DL/I subpool-ID
subpool buffer number.

Figure 12:
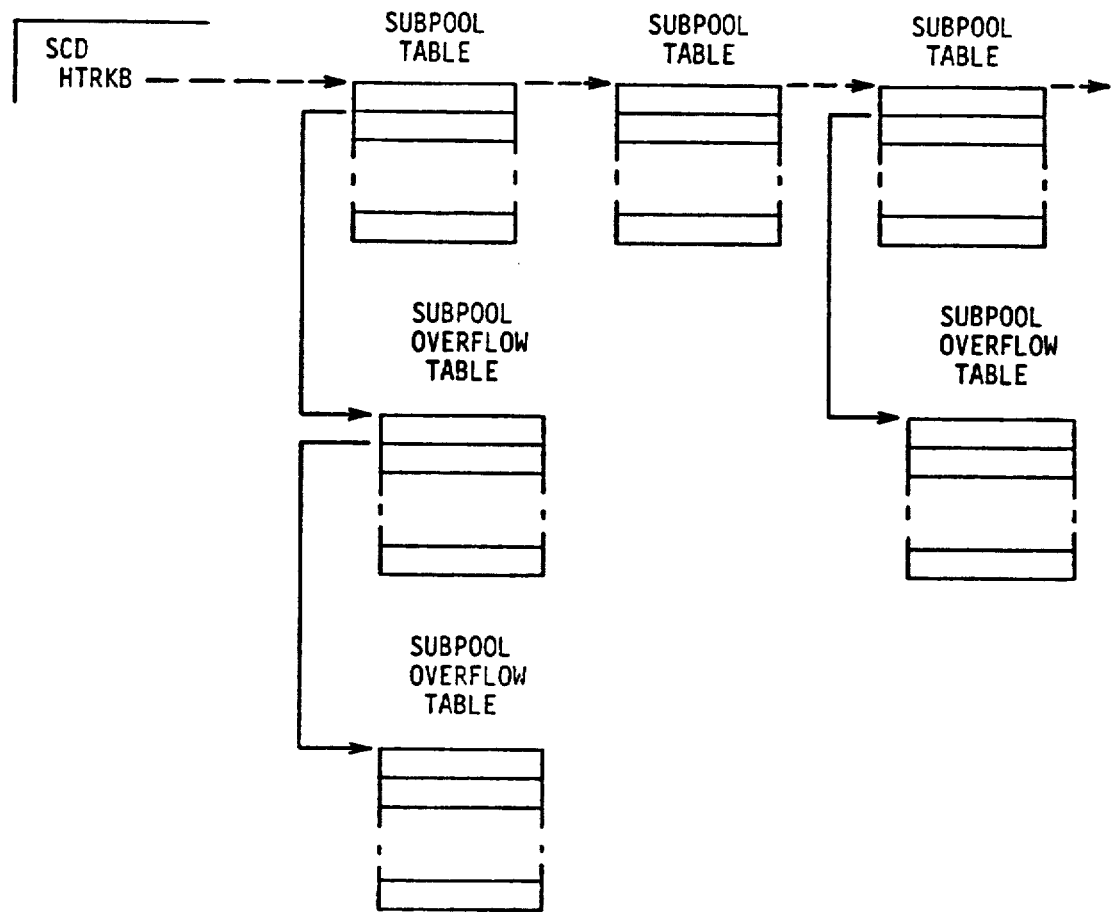

The DL/I buffer information obtained from these log records is maintained in a pool in the alternate subsystem. The pool consists of a group of chained subpool tables (see FIG. 12). There is one table for each ISAM-/OSAM and VSAM subpool used by the "active". Each table is used to track buffers containing "uncommitted" data changes for the associated ISAM/OSAM or VSAM subpool. When "commit" log records are received from the "active", the "uncommitted" flag in the associated table entries is reset. If needed, each table can be expanded up to 255 times to track all of the buffers contained in the associated subpool.

Figure 13:
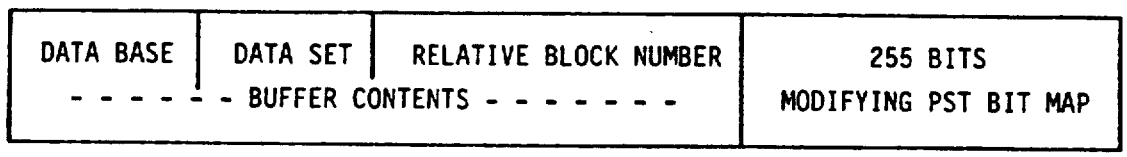

Each 'entry' corresponding to a buffer in a DL/I subpool (see FIG. 13) contains:

a. buffer contents
data base
data set
relative block number
b. modifying region bit map.

The Buffer Tracking log record processing is:

a. X'50' and X'51' log records

Each DL/I Data Base Change log record is processed by using the subpool-ID and buffer number to locate the corresponding 'entry'. If the buffer contents match exactly, the modifying PST bit map bit corresponding to the updating region is turned on.

If the buffer contents do not match, the contents of the existing 'entry' are overlayed with the new information and all modifying PST bit map bits are turned off except the one corresponding to the updating region. A complete search of all 'entries' in all tables for this subpool is also performed to check for duplicate buffer contents. If a duplicate is found, that entire 'entry' is zeroed.

b. X'07', X'37', X'38', X'41, and X'4C' log records

Whenever an X'07', X'37' log record is encountered, all the entries in all subpool tables are processed. In each 'entry', the modifying PST bit map corresponding to the region "committing" is turned off. If this bit map becomes zero, the entire 'entry' is zeroed indicating that the block/control interval would not have to be tolerated if a takeover were to occur. When an X'4C01' or X'4C82' log record is encountered, the above bit map logic is performed only on the entry whose data base name matches that found in the log record.

c. X'53' log record

A Bit Map Update log record is processed by zeroing the entire 'entry' located using the subpool-ID and buffer number.

4. Fast Path "indoubt" buffer reduction:

Unlike DL/I, Fast Path does not write to the data base until all changes have been logged ("committed"). It is possible for the system to fail after logging the changes but before the data base is updated. Fast Path "indoubt" buffers represent logged changes that may not have been written to the data base before the active subsystem failed. Forward Recovery is the task of writing these "indoubt" changes to the data base in case the "active" was unable to do so before failing.

In order for IMS/XRF to reduce the time of a takeover in a Fast Path environment, it was crucial to reduce the number of "indoubt"]Fast Path Area control intervals during their emergency restart forward recovery processing. This was accomplished by modifying the active subsystem's sync point-asynchronous buffer write process to maintain a 'write pending' bit in the DMHR (a control block associated with the buffer).

Figure 14:
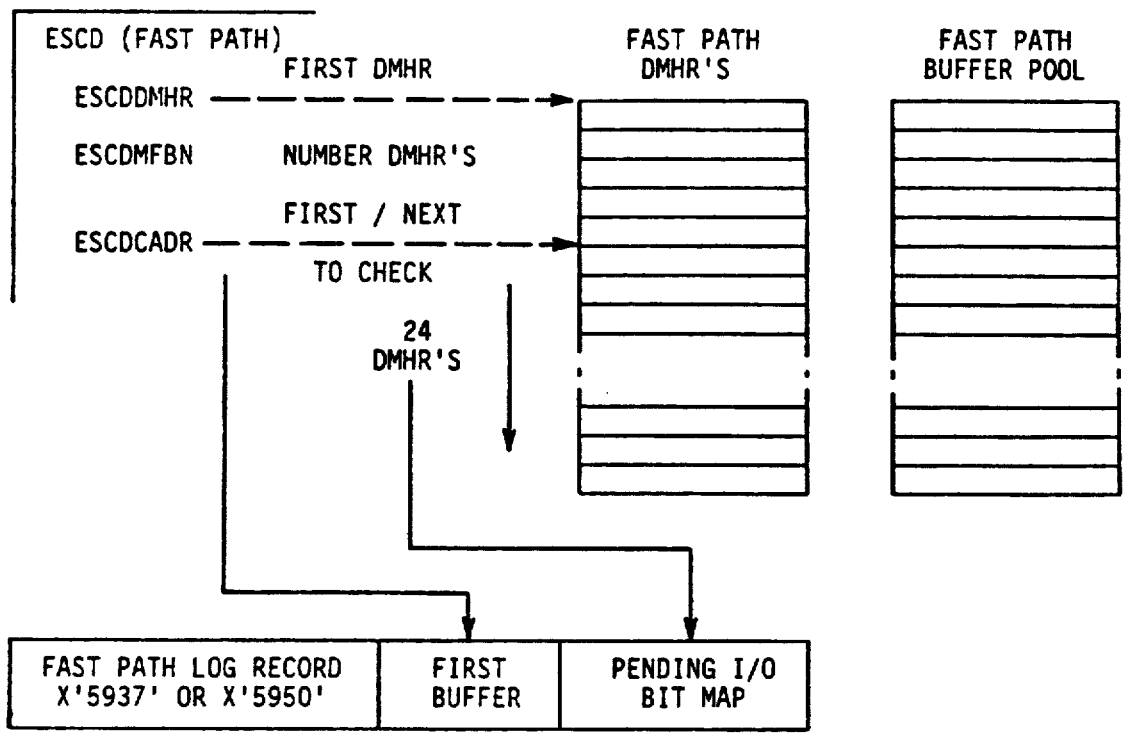
FIG. 14 shows a Fast Path "indoubt" buffer reduction.

Whenever a Fast Path Area Change log record (X'5950') or Fast Path Commit log record (X'5937') is generated, this bit from 24 "sequential" DMHRs is combined to form a 3-byte bit map, and the 3-byte buffer number for the first DMHR checked is placed in a reserved area in these log records. A field controlling the first DMHR to be checked is then updated so that the next log record will check the next 24 "sequential" DMHRs. This result in all Fast Path buffers being swept in a cyclic fashion periodically so that completed I/O can be detected. FIG. 14 illustrates this technique.

Whenever the alternate subsystem processes these log records, it uses the first buffer number to locate the corresponding DMHR and then processes the pending I/O bit map. For every bit that is off, it clears a Forward Recovery required flag in the corresponding DMHR. During the processing of the Area Change log record, this flag is turned on in the DMHR associated with the control interval being changed. When Forward Recovery runs during takeover, only DMHRs with this bit on need be processed. This scheme significantly reduces the number of control intervals which must be read and thus reduces the time of takeover.

Timer Tracking

To keep from destroying the integrity of the data bases after a switchover, the "clock" on the "alternate" must not be earlier than that of the "active". Since ultimately these are derived from the data and time entered by the operator, the "alternate" may have to adjust its time. For performance, the IMS time routine DFSFTIMO only issues an MVS time supervisor service the very first time it is invoked. This value is used to calculate adjustments stored in the IMS System Contents Description block (SCD) which allow the conversion of the hardware STCK (store clock) instruction value to the current date and time.

Since the time was only set approximately by the operator, the alternate subsystem monitors the "timestamps" on the following "critical" log records produced by the active":

a. X'4001'—Begin Checkpoint b. X'50' and X'51'—Data Base Change c. X'595x'—Fast Path Area Change.

Figure 15:
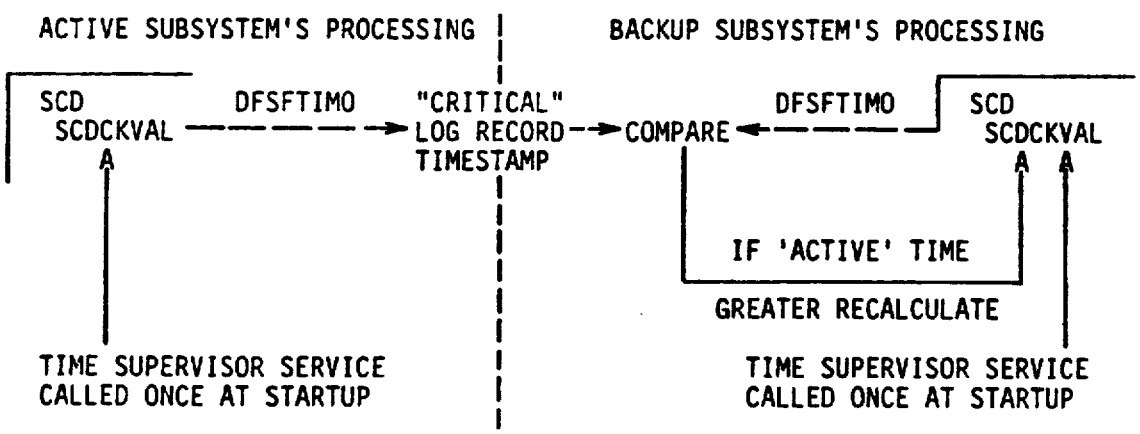
FIG. 15 depicts a timer tracking overview.

For each of the "critical" log records, the alternate subsystem compares the timestamp they contained generated by the "active" with the current time generated by DFSFTIMO. If timer tracking discovers that the active subsystem's timestamp is greater, it recalculates the adjustments stored in the SCD so that the time generated by DFSFTIMO will be greater. FIG. 15 illustrates the timer tracking method.

Surveillance of the Active Subsystem

All surveillance mechanisms are under direct user control. The user selects which mechanisms to activate and specifies what the time-out values for each will be.

The desired surveillance parameters are specified in the IMS PROCLIB member DFSHSBnn. Assume that the following surveillance-related parameters have been specified:

RDS=(1,3),LOG=(1,3),LNK=(3,9),AUTO=YES, SWITCH=(TPEND),(RDS,LOG),(IRLM), . . .

where

LNK refers to the ISC link between "active" and "alternate",

LOG refers to the active subsystem's system log,

RDS refers to the active subsystem's Restart Data Set,

IRLM refers to the IMS Resource Lock Manager, and

TPEND refers to a VTAM failure notification from VTAM to IMS.

These parameters would cause the following surveillance activity:

LNK=(3,9)

Requests that the "active" send a signal over the ISC link every 3 seconds. The "alternate" should invoke the takeover decision function if no signal received for more than 9 seconds.

LOG=(1,3)

Requests that the alternate subsystem check the "active's" system log every second. The "alternate" should invoke the takeover decision function if more than 3 seconds go by without a new log record being generated.

RDS=(2,4)

Requests that the "active" place a timestamp in the RDS every 2 seconds. The "alternate" should invoke the takeover decision function if a new timestamp is not received within 4 seconds.

SWITCH=(TPEND),(RDS,LOG),(IRLM)

The "SWITCH" parameter is used to identify which combinations of failures are to trigger a takeover (or takeover request). In this example, the following failures will cause a takeover to be considered:

1. (TPEND): A VTAM failure that results in a TPEND exit will trigger takeover decision logic.
2. (RDS,LOG): Failure of both RDS and LOG surveillance will cause a takeover decision logic to be invoked. Failure of one or the other is insufficient to trigger a takeover.
3. (IRLM): Am IRLM failure may trigger takeover decision logic.

AUTO=YES

Requests that when a takeover condition occurs, a takeover should proceed without operator intervention. A value of "NO" causes the operator to be alerted of the takeover condition, but the takeover will not occur without operator response.

Tracking will continue until a failure is detected which requires the alternate subsystem to take over processing, or until the operator entered a command directing the alternate to take over processing.

Takeover Phase

This phase includes those functions necessary for the alternate subsystem to become the active IMS/VS subsystem. Only those actions critical to the integrity of IMS/VS are performed. All other actions are performed later in parallel with normal transactions. FIGS. 16 and 17 contain actual code from the module DFSRLPOO. The code shown covers many of the functions performed during the Takeover Phase.

The following functions are performed during the Takeover Phase:

Prohibit further logging by the active subsystem

The Availability Manager is a component of MVS/XA which acts to prevent the failing IMS subsystem from accessing the data bases and the system log. The method used is described by Borden et al, "Method Using Token and Token Table to Prevent I/O Operations to Selected Data Sets After Subsystem Failure", IBM Technical Disclosure Bulletin, Vol. 28, No. 3, Aug. 1985, page 1108.

The code in FIG. 16 controls the execution of the following three functions.

Finish processing the "active's" system log

All records on the active subsystem's log must be read and processed before backouts and forward recoveries can be set up. The log is then closed.

Notify DBRC of the takeover

Data Base Recovery Control (DBRC) assigns the new system log (OLDS).

Switch to the new OLDS log

Merge local message queue with normal message queue

During the Tracking Phase, the alternate subsystem supports operator communications using a "local" message queue. At takeover, the "alternate" automatically moves any messages on this "local" message queue to the "real" normal message queue. This preserves operator transparency and eliminates losing any critical action messages.

The code in FIG. 17 controls the execution of the following two functions.

Initiate the communications network switch

VTAM is instructed by the alternate IMS subsystem to change its User Application Name Variable to the alternate subsystem's VTAM application ID and to perform a session switch whereby the "backup" terminal sessions now become the "active" sessions.

Reacquire DL/I locks

Locks for "uncommitted" data base changes from the active subsystem must be reacquired by the "alternate" to protect these changes before new transaction processing can be enabled.

How DL/I locks are tracked by the "alternate" was discussed earlier as part of the "Tracking Phase" description. Now, at takeover time, the Restart PST Table (RPST) used to track dependent region activity is searched for dependent regions that were active at the time of the takeover. Each RPST contains a PST pointer and it is used to locate all DL/I locks that are chained off the PST. These locks are reacquired by the alternate subsystem.

Invoke the I/O Toleration function

This function allows the takeover to complete even though the alternate subsystem cannot guarantee that I/O Prevention has completed on the active subsystem. I/O Toleration intercepts attempts to write to those portions of a data base that could potentially be overwritten by the failing "active" and saves the changed block or control interval in buffers. When I/O Prevention completes, the I/O Toleration function then does the physical writes to the data bases from the buffers that it has maintained.

Enable DL/I dependent region processing

Dependent regions that were prestarted in the alternate subsystem are now enabled and can begin entering new transactions concurrent with data base backout. The reacquired locks preserve data base integrity.

Dependent regions with access to Fast Path DEDBs remain suspended. They will be enabled after all Fast Path locks are reacquired.

Active Phase

This phase includes the functions necessary to provide service to the end user. It also includes those recovery functions that were set up during the Takeover Phase but which can be run in parallel with new work. At this point, takeover has completed and the "alternate" system is now the "active"]system.

The function described below execute in parallel with normal DL/I transaction processing. However, the processing of new transactions involving Fast Path data bases has not yet begun.

Complete the communications network switching

The terminal session switching activity begun during the Takeover Phase continues in parallel with new work and other recovery activities until completed. As the session switch is performed, session status information, maintained by NCP, is returned to the alternate IMS subsystem. IMS compares this information with the information recorded on the system log by the failing "active". This comparison permits the detection of any missing communication activity and recovery by either resending the missing output reply or by requesting the resending of the missing input requires. It is this "session recovery" function that provides end terminal user transparency to the takeover.

Perform DL/I dynamic data base backouts

Figure 10:
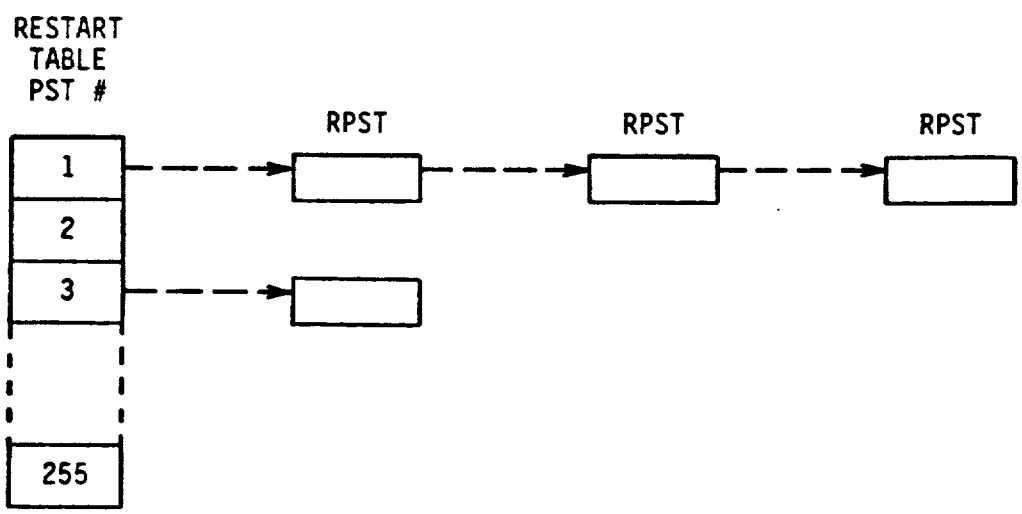
FIG. 10 sets out a dependent region restart table structure.

Restart PSTs (RPSTs) depicted in FIG. 10 are now used to drive the "backout" effort. As backouts complete, the affected portions of the data base are made available to new transactions.

Reacquire Fast Path locks

Locks for "committed" data base changes from the active subsystem must be reacquired by the "alternate" to protect these changes before new transaction processing can be enabled.

All Fast Path buffer headers (DMHRs) are searched to determine which ones represent "indoubt" data base changes. For those that do, the appropriate Fast Path locks are reacquired.

Enable Fast Path dependent region processing

Fast Path dependent regions that were prestarted in the alternate subsystem are now enabled and can begin entering new transactions concurrent with forward recovery. The reacquired locks prohibit new transactions from accessing the locked portions of the data base until forward recovery completes and the locks are released.

Perform Fast Path Forward Recovery

Prior to IMS/XRF, the Fast Path Forward Recovery was a totally serial process that had to complete before new work was started. That has been changed, however, to allow the processing of new work concurrent with Fast Path Forward Recovery during an "XRF" takeover. Now, multiple IMS ITASKs are created to perform multiple Forward Recoveries simultaneously and to do them concurrent with new work.

Each ITASK obtains a Fast Path data base area to process from a chain of areas requiring Forward Recovery. Each ITASK then performs all required Forward Recoveries for its area. When finished with an area, the ITASK will go to the chain to remove another area. This continues until the Forward Recovery chain is empty.

We claim:
1. In a data processing system having control means which allow at least two data base systems to execute independently and access a shared storage means containing a shared at a base, and having means for communication of data between the data base systems, the method comprising the steps of:
 (a) starting an active data base system which begins transaction processing and writing predetermined status information in a log in the shared storage, the log being distinct from the shared data base;
 (b) starting an alternate data base system which does not begin transaction processing;
 (c) synchronizing the alternate data base system with the data base system by communicating a request to the active data base system, thereby causing the active data base system to communicate predetermined checkpoint data to the alternate data base system; and
 (d) using the log to track the status of the active data base system, thereby enabling the alternate data base System to take over transaction processing in the event that the active data base system fails.

2. The method of claim 1 wherein the data processing system has a first clock usable by the active data base system and a second clock usable by the alternate data base system, the method further comprising the steps of communicating time information from the first clock to the alternate data base system, comparing time information from the second clock with the first clock, and computing an adjustment factor, thereby ensuring that timestamps generated by the alternate data base system do not indicate an earlier time than the timestamps generated by the active data base system.

3. In a data processing system having multiple processors, having control means which allow at least two data base systems to execute independently and to access a shared data storage means containing a shared data base, and having means for communication of data between the data base systems, the method comprising the steps of:
- (a) starting an active data base system on a first selected processor, thereby beginning transaction processing;
- (b) writing predetermined status information about the active data base system's transaction processing into a log in the shared data storage, the log being in addition to the shared data base;
- (c) starting an alternate data base system on a second selected processor while preventing the commencement of transaction processing by the alternate data base system;
- (c) synchronizing the alternate data base system with the active data base system by communicating a request to the active data base system, thereby causing the active data base system to write checkpoint data in the log for reading by the alternate data base system;
- (e) tracking, by use of the log, the status of the active data base system without duplicating the actions of the active data base system, thereby enabling the alternate data base system to take over transaction processing in the event that the active data base system fails;
- (f) monitoring the actions of the active data base system by periodically examining the content of the log to detect failure of the active data base system; and
- (g) transferring control of transaction processing to the alternate data base system in the event that a failure of the active data base system is detected.

4. The method of claim 3 further comprising the step of monitoring the status of the active data base system by sending periodic messages from the active data base system to the alternate data base system, thereby allowing active data base system failure to be detected by the absence of a message.

5. The method of claim 3 wherein the data processing system has a plurality of clocks and the active data base system uses a first clock and the alternative data base system uses a second clock, the method further comprising the step of communicating information about the first clock to the alternate data base system, thereby allowing the alternate data base system to compare the second clock with the first clock and to compute an adjustment factor which will ensure that timestamps generated by the alternate data base system do not indicate an earlier time than the timestamps generated by the active data base system.

6. A data processing system comprising:
- (a) control means which allow at least two data base systems to execute independently;
- (b) a data storage means capable of containing a shared at a base capable of being shared by each of the data base systems without the need for maintaining a duplicate copy of the shared data base;
- (c) means for communication of data between the data base systems;
- (d) means for starting an active data base system to begin transaction processing and writing predetermined status information in a log in the shared data storage;
- (e) means for starting an alternate database system which does not begin transaction processing;
- (f) means for synchronizing the alternate data base system with the active data base system by communicating a request to the active data base system, thereby causing the active data base system to write checkpoint data in the log for reading by the alternate data base system; and
- (g) means for tracking and monitoring, by use of the log, the status of the active data base system, thereby enabling the alternate data base system to take over transaction processing in the event that the active data base system fails.

7. The data processing system of claim 4 further comprising:
- (a) a first clock associated with the active data base system:
- (b) a second clock associated with the alternate data base system; and
- (c) means for computing an adjustment factor based on a comparison of a time indicated by the first clock with a time indicated by the second clock, thereby ensuring that timestamps generated by the alternate data base system do not indicate an earlier time than the timestamps generated by the active data base system.

8. In a data processing system having a processor, control means which allow at least two data base systems to execute independently and to access a shared data storage means containing a shared data base, and means for communication of data between the data base systems, the method comprising the steps of:
- (a) starting an active data base system on the processor, thereby beginning transaction processing on the shared data base;
- (b) writing predetermined status information about the active data base system's transaction processing into a log in the shared data storage;
- (c) starting an alternate data base system on the processor while preventing the commencement of transaction processing by the alternate data base system;
- (d) synchronizing the alternate data base system with the active data base system by communicating a request to the active data base system, thereby causing the active data base system to communicate checkpoint data to the alternate data base system;
- (e) tracking, by use of the log, the status of the active data base system without duplicating the actions of the active data base system, thereby maintaining synchronization between the active and alternate data base system;
- (f) monitoring the actions of the active data base system by periodically examining the contents of the log to detect failure of the active data base system; and
- (g) transferring control of transaction processing to the alternate data base system in the event that a failure of the active data base system is detected.

* * * * *

UNITED STATES PATENT AND TRADEMARK OFFICE
CERTIFICATE OF CORRECTION

PATENT NO. : 5,155,678
DATED : October 13, 1992
INVENTOR(S) : Takeshi Fukumoto, et al.

It is certified that error appears in the above-identified patent and that said Letters Patent is hereby corrected as shown below:

On the Title page, item [75]: Inventors:

Delete " Takayuki Funahasi " and insert -- Takayuki Funahashi --

IN THE CLAIMS

Column 21, line 57, delete " at a " and insert -- data -- after base

Column 22, line 55, delete " system; " and insert -- systems; --

Signed and Sealed this

Twelfth Day of October, 1993

Attest:

BRUCE LEHMAN

Attesting Officer     Commissioner of Patents and Trademarks